(12) United States Patent
Eriksson et al.

(10) Patent No.: US 9,583,831 B2
(45) Date of Patent: Feb. 28, 2017

(54) ELECTRICALLY STEERABLE ANTENNA ARRANGEMENT

(75) Inventors: Stefan Eriksson, Landvetter (SE); Magnus Isacsson, Göteborg (SE); Claes Nylund, Mölnlycke (SE)

(73) Assignee: SAAB AB, Linkoeping (SE)

( * ) Notice: Subject to any disclaimer, the term of this patent is extended or adjusted under 35 U.S.C. 154(b) by 667 days.

(21) Appl. No.: 14/113,367

(22) PCT Filed: Apr. 26, 2011

(86) PCT No.: PCT/SE2011/050501
§ 371 (c)(1),
(2), (4) Date: Oct. 30, 2013

(87) PCT Pub. No.: WO2012/148323
PCT Pub. Date: Nov. 1, 2012

(65) Prior Publication Data
US 2014/0049426 A1 Feb. 20, 2014

(51) Int. Cl.
*H01Q 3/00* (2006.01)
*H01Q 3/26* (2006.01)
(Continued)

(52) U.S. Cl.
CPC ............. *H01Q 3/26* (2013.01); *G01S 7/4026* (2013.01); *G01S 2013/0254* (2013.01)

(58) Field of Classification Search
CPC .. H01Q 3/26; G01S 7/4026; G01S 2013/0254
(Continued)

(56) References Cited

U.S. PATENT DOCUMENTS 6,940,447 B2 9/2005 Voigtlaender et al.
2008/0111731 A1 5/2008 Hubbard et al.

FOREIGN PATENT DOCUMENTS

EP 0106438 A1 4/1984
EP 0247780 A2 12/1987
(Continued)

OTHER PUBLICATIONS

Alan Fenn. RES.LL-002 Adaptive Antennas and Phased Arrays, Spring 2010. (Massachusetts Institute of Technology: MIT OpenCourseWare), http://ocw.mit.edu (Accessed Jun. 27, 2016). License: Creative Commons BY-NC-SA.*

(Continued)

*Primary Examiner* — Frank J McGue
(74) *Attorney, Agent, or Firm* — Alston & Bird LLP

(57) ABSTRACT

An electrically steerable antenna arrangement comprising at least a first antenna function and a second antenna function, each antenna function comprising at least one antenna element, the antenna functions having at least one main radiation lobe that is electrically steerable, where each antenna function comprises at least one signal altering means arranged for altering the time characteristics and/or phase characteristics and/or frequency characteristics of a signal fed through the signal altering means, the electrically steerable antenna arrangement comprising a control unit arranged for feeding a signal comprising control information to the antenna functions via a control connection, the signal altering means being arranged to take certain settings in dependence of the control information, such that for certain settings of the signal altering means, a certain angular direction of said main radiation lobe in relation to an antenna reference plane is acquired. The electrically steerable antenna arrangement further comprises a first monitoring unit connected to the control connection, and a second monitoring unit connected to the antenna functions, the first monitoring unit being arranged to analyze the control information fed to the signal altering means and trigger a first alert via a first alert connection if there is a deviation which exceeds a first threshold, where furthermore the antenna functions are arranged to send signal information to the second monitoring unit regarding the resulting signal fed to (Continued)

said antenna elements, the second monitoring unit being arranged to analyze said signal information and to trigger a second alert via a second alert connection if there is a deviation which exceeds a second threshold.

16 Claims, 7 Drawing Sheets

(51) Int. Cl.
 *G01S 7/40* (2006.01)
 *G01S 13/02* (2006.01)
(58) Field of Classification Search
 USPC .......................................................... 342/372
 See application file for complete search history.

(56) References Cited

FOREIGN PATENT DOCUMENTS

| EP | 1014485 A1 | 6/2000 |
|---|---|---|
| WO | WO 02/39141 A1 | 5/2002 |
| WO | WO 2004/088790 A1 | 10/2004 |
| WO | WO 2004/102739 A1 | 11/2004 |
| WO | WO 2009/144435 A1 | 12/2009 |

OTHER PUBLICATIONS

European Patent Office, Extended European Search Report for Application No. 11864300.6, Aug. 7, 2014, 6 pages, Germany.
International Searching Authority, International Search Report and Written Opinion for International Application No. PCT/SE2011/050501, mailed Jan. 10, 2012, 8 pages, Swedish Patent and Registration Office, Sweden.

* cited by examiner

23a

| 0 | 0 | 1 | 0 |
|---|---|---|---|
| 0 | 0 | 0 | 2 |
| 1 | 0 | 0 | 0 |
| 0 | 1 | 0 | 1 |

| 9 | 8 | 7 | 9 |
|---|---|---|---|
| 8 | 7 | 9 | 9 |
| 7 | 9 | 6 | 7 |
| 9 | 9 | 8 | 8 |

FIG. 8

ELECTRICALLY STEERABLE ANTENNA ARRANGEMENT

CROSS REFERENCE TO RELATED APPLICATIONS

This application is a national stage application, filed under 35 U.S.C. §371, of International Application No. PCT/SE2011/050501, filed Apr. 26, 2011, the contents of which are hereby incorporated by reference in its entirety.

BACKGROUND

Related Field

The present invention relates to the field of monitoring radiated electromagnetic energy.

The present invention relates to an electrically steerable antenna arrangement comprising at least a first antenna function and a second antenna function, each antenna function comprising at least one antenna element, the antenna functions having at least one main radiation lobe that is electrically steerable, where each antenna function comprises at least one signal altering means arranged for altering the time characteristics and/or phase characteristics and/or frequency characteristics of a signal fed through the signal altering means, the electrically steerable antenna arrangement comprising a control unit arranged for feeding a signal comprising control information to the antenna functions via a control connection, the signal altering means being arranged to take certain settings in dependence of the control information, such that for certain settings of the signal altering means, a certain angular direction of said main radiation lobe in relation to an antenna reference plane is acquired.

The present invention further relates to a method for controlling an electrically steerable antenna arrangement having at least a first antenna function and a second antenna function, the antenna functions having at least one main radiation lobe that is electrically steerable.

Description of Related Art

Electromagnetic radiations from powerful active electromagnetic sensor systems, such as radars, have strict security regulations which normally results in safety areas which may be difficult and/or expensive to maintain.

Scanning sensor systems comprising phase controlled antennas, electrically controlled antennas or active electrically controlled antennas have the functionality to direct and focus emitted energy in a flexible way. If no special precautions are made, the scanning sensor systems using such antennas require larger safety areas than more traditional antenna systems.

Technical solutions ensuring personal safety are more expensive to develop than technical solutions which do not have to take personal safety into account. It is therefore of interest to keep the functions for personal safety as uncomplicated as possible, such that the complexity of the maintaining of its proper function is minimized.

Today, monitoring functions are positioned within a space around the antenna, and are equipped to measure the energy radiated from the antenna. Such solutions are complicated and expensive, requiring equipment for measuring antenna radiation.

There is thus a demand for an uncomplicated and inexpensive device and a corresponding method for monitoring radiated electromagnetic energy from scanning sensor systems in a certain space and to enable detection of events that may cause the exceeding of predefined safety levels in this space.

BRIEF SUMMARY

The object of the present invention is to provide an uncomplicated and inexpensive device and a corresponding method for monitoring radiated electromagnetic energy from scanning sensor systems in a certain space and to enable detection of events that may cause the exceeding of predefined safety levels in this space.

This object is achieved by means of an electrically steerable antenna arrangement comprising at least a first antenna function and a second antenna function, each antenna function comprising at least one antenna element, the antenna functions having at least one main radiation lobe that is electrically steerable, where each antenna function comprises at least one signal altering means arranged for altering the time characteristics and/or phase characteristics and/or frequency characteristics of a signal fed through the signal altering means, the electrically steerable antenna arrangement comprising a control unit arranged for feeding a signal comprising control information to the antenna functions via a control connection, the signal altering means being arranged to take certain settings in dependence of the control information, such that for certain settings of the signal altering means, a certain angular direction of said main radiation lobe in relation to an antenna reference plane is acquired, characterized in that the electrically steerable antenna arrangement further comprises a first monitoring unit connected to the control connection, and a second monitoring unit connected to the antenna functions, the first monitoring unit being arranged to analyze the control information fed to the signal altering means and trigger a first alert via a first alert connection if there is a deviation which exceeds a first threshold, where furthermore the antenna functions are arranged to send signal information to the second monitoring unit regarding the resulting signal fed to said antenna elements, the second monitoring unit being arranged to analyze said signal information and to trigger a second alert via a second alert connection if there is a deviation which exceeds a second threshold.

Said object is further achieved by means of a method for controlling an electrically steerable antenna arrangement having at least a first antenna function and a second antenna function, the antenna functions having at least one main radiation lobe that is electrically steerable, the method comprising the steps: feeding a control signal to signal altering means used for altering time characteristics and/or phase characteristics and/or frequency characteristics of a signal fed through the signal altering means; and the signal altering means taking certain settings in dependence of the control signal, such that for certain settings of the signal altering means a certain angular direction of said main radiation lobe is acquired; characterized in that the method further comprises the steps: monitoring the control signal; monitoring the characteristics of the signal fed through the signal altering means; analyzing the control signal fed to the signal altering means and triggering a first alert if there is a deviation which exceeds a first threshold; and analyzing the characteristics of the signal fed through the signal altering means and triggering a second alert if there is a deviation which exceeds a second threshold.

According to a further advantageous aspect of the invention, the antenna functions are positioned adjacent each other in an azimuth plane and/or an elevation plane.

According to a further advantageous aspect of the invention, said main radiation lobe is steerable in said azimuth plane and/or in said elevation plane.

According to a further advantageous aspect of the invention, the control information fed to the antenna functions via the control connection comprises expected angular values.

According to a further advantageous aspect of the invention, each antenna function comprises at least one control means arranged for receiving the control information from the control connection and for controlling the signal altering means in dependence of the control information.

According to a further advantageous aspect of the invention, the first monitoring unit is arranged for statistically analyzing the expected angular values fed via the control connection and for triggering the first alert when the number of certain expected angular values during a certain time period exceeds the first threshold.

According to a further advantageous aspect of the invention, the first monitoring unit is arranged for performing said statistical analyzing by analyzing histogram data.

According to a further advantageous aspect of the invention, each antenna function comprises at least one monitoring means arranged for determining how the phase of the resulting signal fed to said antenna elements changes during certain time intervals.

According to a further advantageous aspect of the invention, said monitoring means are arranged for sending signal information to the second monitoring unit, the signal information comprising data regarding whether the phase change of the resulting signal fed to said antenna elements during a certain time interval falls below a third threshold.

According to a further advantageous aspect of the invention, the second monitoring unit is arranged for analyzing the signal information in the form of histogram data.

A number of advantages are obtained by means of the present invention, for example:
- A possibility to reduce the safety area, which makes the handling easier of the scanning sensor systems during testing, demonstration and normal use;
- A relatively inexpensive solution;
- An uncomplicated and robust solution provides a reliable functionality;
- No external equipment necessary;
- Easily understood and handled;
- The solution is possible to introduce into an existing system.

BRIEF DESCRIPTION OF THE FIGURES

The present invention will now be described more in detail with reference to the appended drawings, where:

FIG. 7 shows first histogram data analyzed in the second monitoring unit;

FIG. 8 shows second histogram data analyzed in the second monitoring unit; and

DETAILED DESCRIPTION OF VARIOUS EMBODIMENTS

Figure 1:
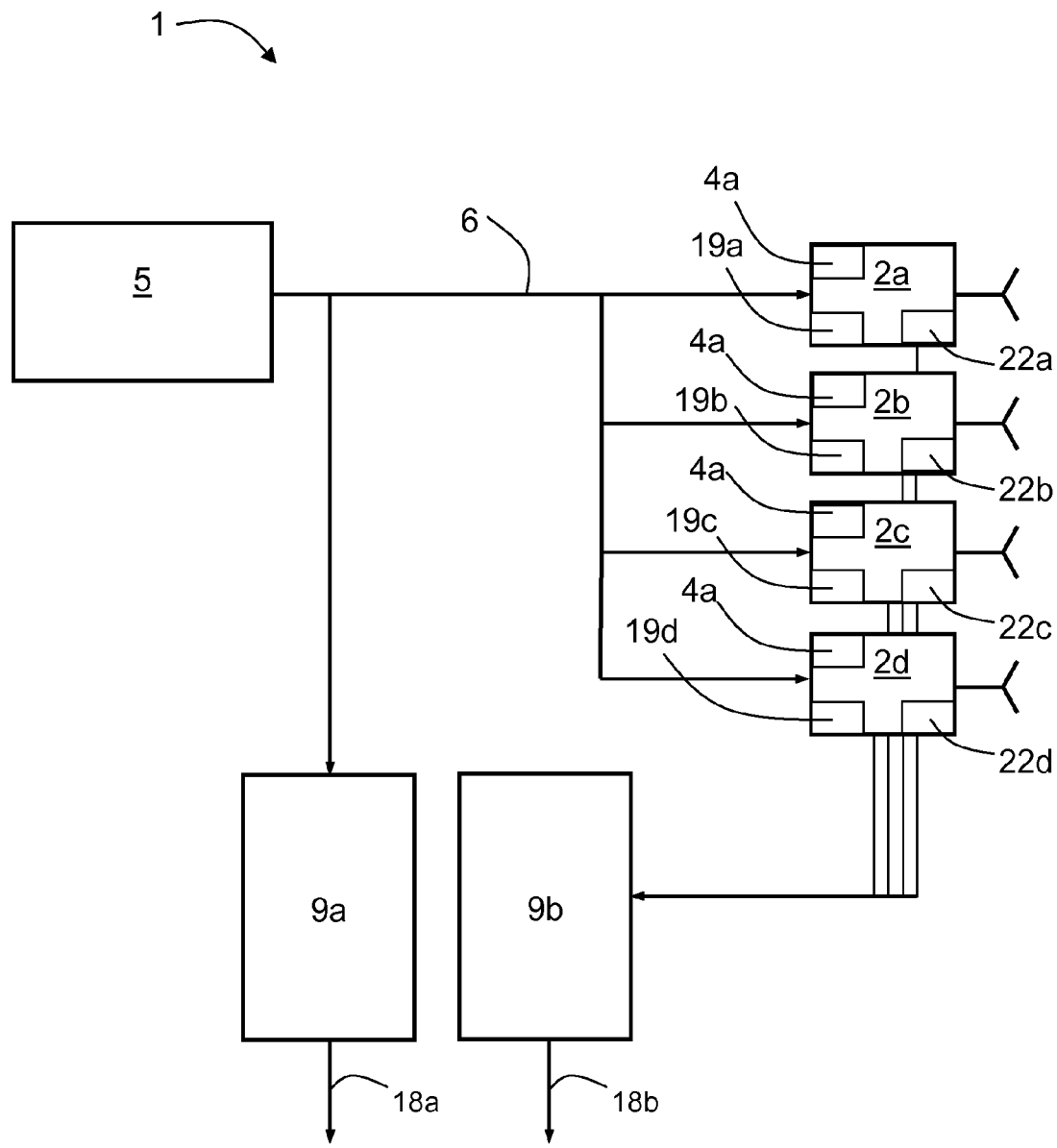
FIG. 1 schematically shows an antenna arrangement according to the present invention.
Figure 3:
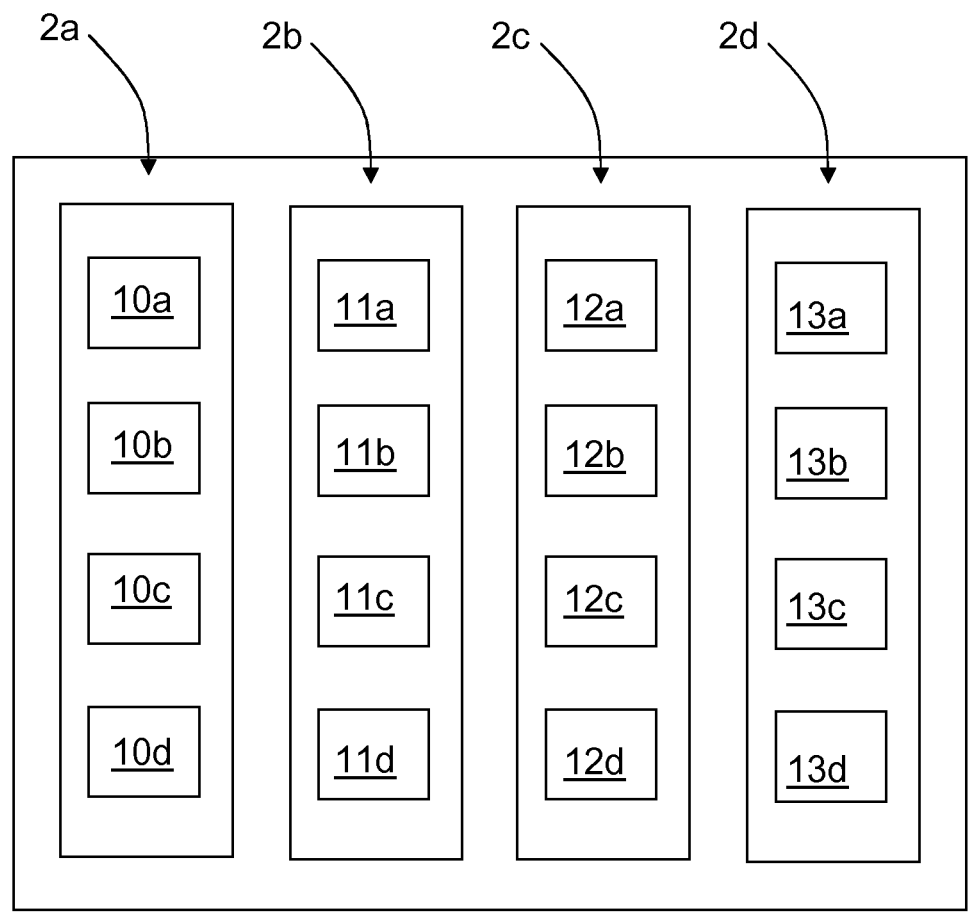
FIG. 3 schematically shows a front view of antenna functions comprised in the antenna arrangement according to the present invention.

With reference to FIG. 1, there is an electrically steerable antenna arrangement 1 comprising a first antenna function 2a, a second antenna function 2b, a third antenna function 2c and a fourth antenna function 2d. With reference also to FIG. 3, each antenna function 2a, 2b, 2c, 2d comprising four antenna elements 10a, 10b, 10c, 10d; 11a, 11b, 11c, 11d; 12a, 12b, 12c, 12d; 13a, 13b, 13c, 13d, where the antenna functions 2a, 2b, 2c, 2d are positioned adjacent each other in an azimuth plane.

Figure 2:
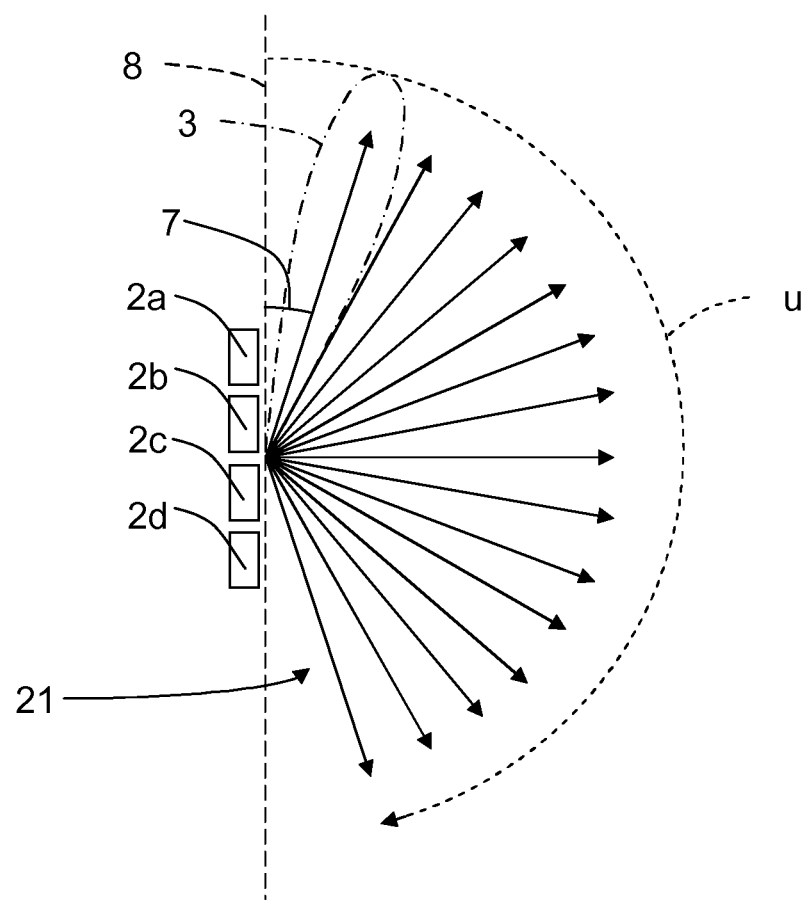
FIG. 2 schematically shows a top view of antenna functions comprised in the antenna arrangement according to the present invention.

With reference also to FIG. 2, showing a top view of the antenna functions, the antenna functions 2a, 2b, 2c, 2d have a main radiation lobe 3 that is electrically steerable along angles u in said azimuth plane, the radiation lobe indicated in FIG. 3 being directed in a certain first azimuth angle 7. The angles are measured with reference to an antenna reference plane 8. In this way the main radiation lobe 3 is steered into a number of directions 21.

Each antenna function 2a, 2b, 2c, 2d comprises a corresponding phase shifter 4a, 4b, 4c, 4d arranged for altering the phase characteristics of a signal fed through it. The electrically steerable antenna arrangement 1 also comprises a control unit 5 arranged for feeding a signal comprising control information to the antenna functions 2a, 2b, 2c, 2d via a control connection 6, the phase shifters 4a, 4b, 4c, 4d being arranged to take certain settings in dependence of the control information.

In this example, the control information fed to the antenna functions 2a, 2b, 2c, 2d via the control connection 6 comprises expected angular values u, each antenna function 2a, 2b, 2c, 2d comprises a corresponding control means 19a, 19b, 19c, 19d arranged for receiving the expected angular values u from the control connection 6 and for controlling the corresponding phase shifters 4a, 4b, 4c, 4d, thus controlling the main radiation lobe 3.

For certain settings of the phase shifters 4a, 4b, 4c, 4d, a certain angular direction of the main radiation lobe 3 in relation to the antenna reference plane 8 is acquired, for example for a first setting of the phase shifters 4a, 4b, 4c, 4d, the main radiation lobe 3 is directed in the first azimuth angle 7.

According to the present invention, the electrically steerable antenna arrangement 1 further comprises a first monitoring unit 9a, connected to the control connection 6, and a second monitoring unit 9b, connected to the antenna functions 2a, 2b, 2c, 2d.

The first monitoring unit 9a is arranged to analyze the control information fed to the phase shifters 4a, 4b, 4c, 4d by statistically analyzing the expected angular values u, fed via the control connection 6 in the form of histogram data. This is going to be discussed more in detail with reference to FIG. 4 and FIG. 5.

Figure 4:
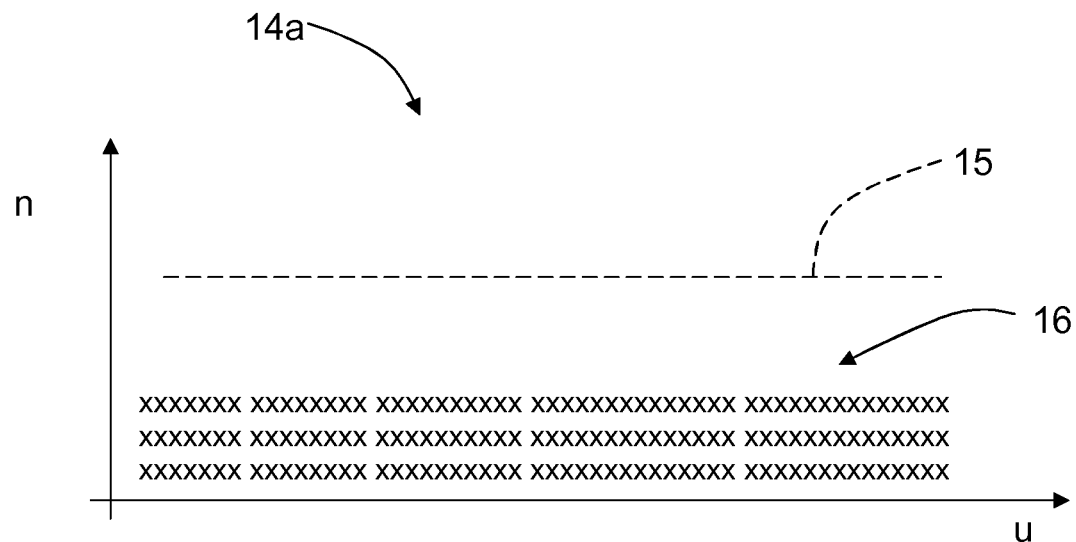
FIG. 4 shows first histogram data analyzed in the first monitoring unit.
Figure 5:
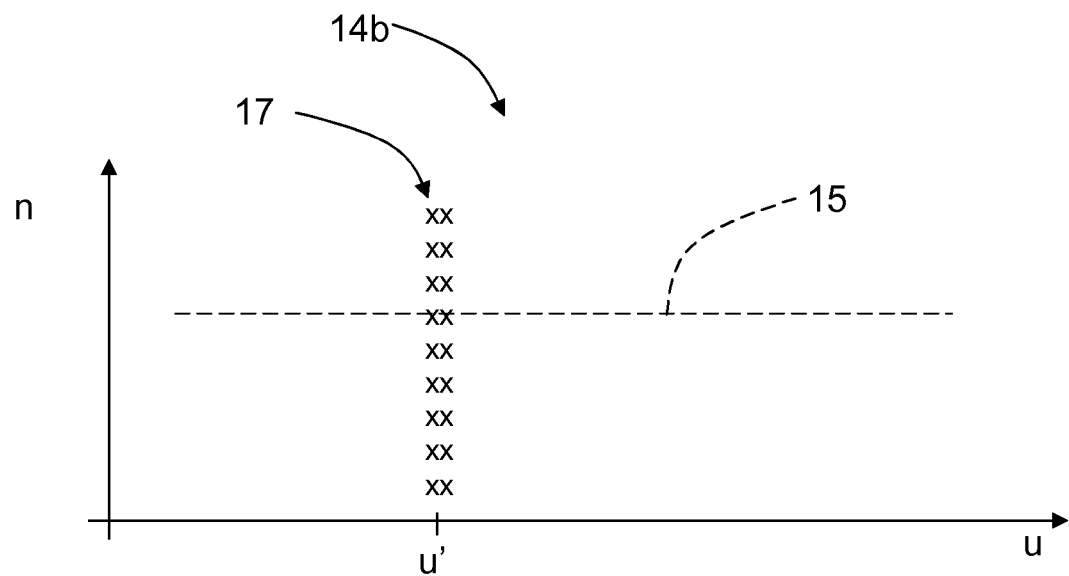
FIG. 5 shows second histogram data analyzed in the first monitoring unit.

FIG. 4 shows a first histogram 14a where the x-axis shows the angle u and the y-axis shows the number n of detected values for the angle u. The histogram data 16 is shown with the letter x, each x symbolizing a detected value at a certain time. With reference also to FIG. 5, showing a second histogram 14b, the first monitoring unit 9a is arranged to trigger a first alert via a first alert connection 18a when the number of certain expected angular values u' during a certain time period exceeds a first threshold 15.

The histogram data 16 in the first histogram 14a indicate that none of the expected angular values exceeds a first threshold 15 during said time period, and in this case no alarm is triggered.

The histogram data 17 in the second histogram 14b indicate that the expected angular values for a certain expected angular values u' exceeds the first threshold 15 during said time period, and in this case the alarm is triggered. At certain time periods, the histogram 14a, 14b is cleared.

Furthermore, in accordance with the present invention, the antenna functions 2a, 2b, 2c, 2d are arranged to send signal information to the second monitoring unit 9b regarding the resulting signal fed to the antenna elements 10a, 10b, 10c, 10d; 11a, 11b, 11c, 11d; 12a, 12b, 12c, 12d; 13a, 13b, 13c, 13d. The second monitoring unit 9b is arranged to analyze this signal information and to trigger a second alert via a second alert connection 18b if there is a deviation which exceeds a second threshold, this is going to be discussed more in detail below.

Each antenna function 2a, 2b, 2c, 2d comprises at least one monitoring means 19a, 19b, 19c, 19d arranged for determining how the phase of the resulting signal fed to said antenna elements 10a, 10b, 10c, 10d; 11a, 11b, 11c, 11d; 12a, 12b, 12c, 12d; 13a, 13b, 13c, 13d changes during certain time intervals. The monitoring means 19a, 19b, 19c, 19d are arranged for sending signal information to the second monitoring unit 9b, the signal information comprising data regarding whether a phase change $\Delta\phi$ of the resulting signal fed to said antenna elements 10a, 10b, 10c, 10d; 11a, 11b, 11c, 11d; 12a, 12b, 12c, 12d; 13a, 13b, 13c, 13d during a certain time interval falls below a third threshold $\Delta\phi_{min}$, the data thus stating whether $\Delta\phi_{min} \geq |\phi_{mi} - \phi_{m(i-1)}|$ or not, and in practice this discloses whether the phase changes or has been stuck at a certain value. Here $\phi_{min}$ denotes the phase of the antenna element m, at the time i, and $\phi_{min(i-1)}$ denotes the phase of the antenna element m, at the time i−1.

This is illustrated in FIG. 7 and FIG. 8, showing a first histogram 23a and a second histogram 23b having a corresponding grid, where the grid corresponds to the antenna elements 10a, 10b, 10c, 10d; 11a, 11b, 11c, 11d; 12a, 12b, 12c, 12d; 13a, 13b, 13c, 13d in FIG. 3. In the histograms 23a, 23b, the numbers in the grid squares correspond to how many times the phase change of the resulting signal fed to the antenna elements has fallen below the third threshold during a certain time interval, for example one second. This means that the numbers in the grid squares correspond to how many times $\Delta\phi_{min} \geq |\phi_{mi} - \phi_{m(i-1)}|$.

If the second threshold is 5 in this example, it means that the second monitoring unit 9b does not trigger the second alert for the first histogram 23a, but that the second monitoring unit 9b does trigger the second alert for the second histogram 23b.

At certain time periods, the histogram 23a, 23b is cleared.

For example, the histograms of the first monitoring unit 9a may generally be calculated as an effect P, time T and space G-oriented histogram $E_{n,m}$ for all times n∈N and all antenna control intervals m∈M over the product P·G·T. Four examples are given below:

$$E_{n,m} = P_n \cdot G_n \int_{t|\hat{m}(t)\in M} dt \quad (1)$$

$$E_{n,m} = P_n \int_{t|\hat{m}(t)\in M} G_n(t) dt \quad (2)$$

$$E_{n,m} = G_n \int_{t|\hat{m}(t)\in M} P_n(t) dt \quad (3)$$

$$E_{n,m} = \int_{t|\hat{m}(t)\in M} P_n(t) \cdot G_n(t) dt \quad (4)$$

where $\hat{m}(t) \in M$ is the current antenna control at the time t. The four examples show time interval fixed or time variable G and also time interval fixed or time variable P. N represents all time intervals and M represents all possible antenna controls.

For example, the histograms of the first monitoring unit 9a are generally calculated by forming the number of deviations $q_k$, i.e. state changes, over a time period $\Delta T$ for all antenna elements k∈K, where K denotes all the antenna elements in the antenna arrangement 1. This means that $$q_k = \frac{t_k}{\Delta T} \quad (5)$$

is formed, where the deviation rate, i.e. state change rate $t_k$, is integrated according to:

$$t_k = \int_{t_a|a\in A_1 \text{ during the time } \Delta T} dt \quad (6)$$

where $A_1 \cup A_2 = A$ where $A_1$ contains all deviating antenna element states, i.e. all sequences/permutations of changing antenna element states, $A_2$ contains all non-deviating antenna element states, i.e. all sequences/permutations of non-changing antenna element states, and thus A containing all possible antenna states, i.e. all possible sequences/permutations of antenna states.

The present invention is not limited to the examples above, but may vary freely within the scope of the claims.

Figure 6:
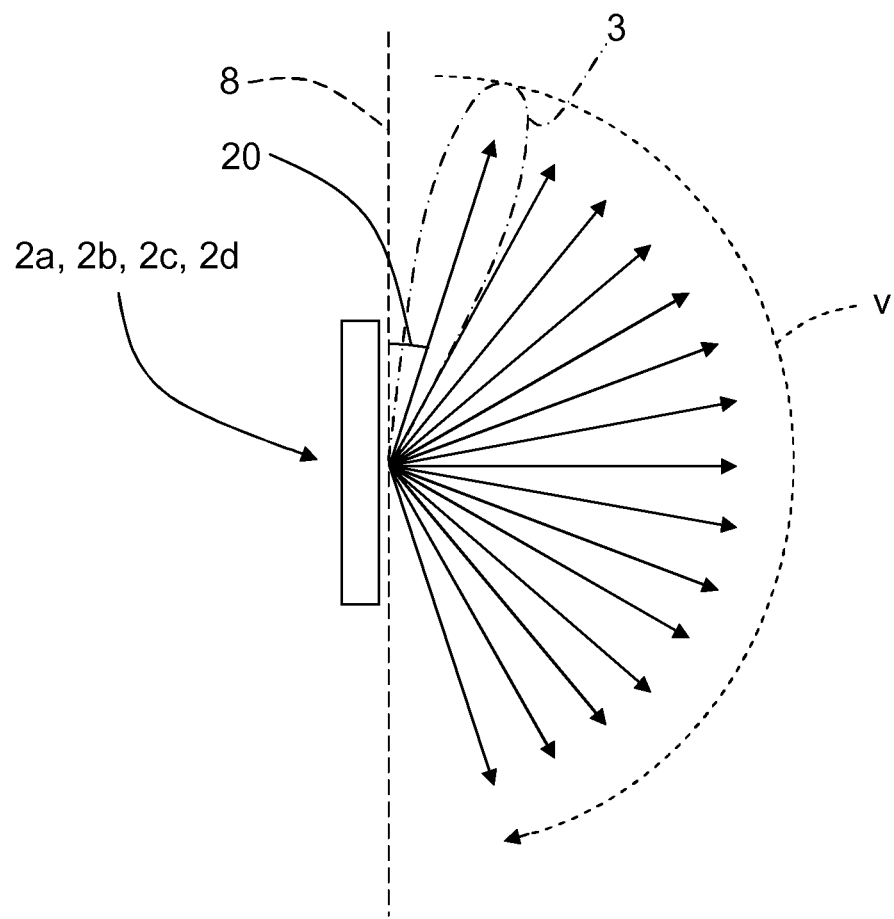
FIG. 6 schematically shows a side view of antenna functions comprised in the antenna arrangement according to the present invention.

For example, with reference to FIG. 6, showing a side view of the antenna functions, the antenna functions 2a, 2b, 2c, 2d have a main radiation lobe 3 that is electrically steerable along angles v in an elevation plane, the radiation lobe indicated in FIG. 3 being directed in a certain first elevation angle 20. The angles are measured with reference to the antenna reference plane 8. Of course, the main radiation lobe may be directed in azimuth and elevation at the same time, the control information fed to the antenna functions 2a, 2b, 2c, 2d via the control connection 6 comprising expected angular values u, v.

The antenna functions may furthermore be arranged to radiate several main lobes, constituting a multi-lobe antenna.

The antenna functions may be arranged in any suitable way and may comprises any suitable number of antenna elements, but the antenna arrangement according to the present invention comprises at least two antenna functions, each antenna function comprising at least one antenna element. The antenna functions may be positioned adjacent each other in an azimuth plane and/or an elevation plane.

Figure 9:
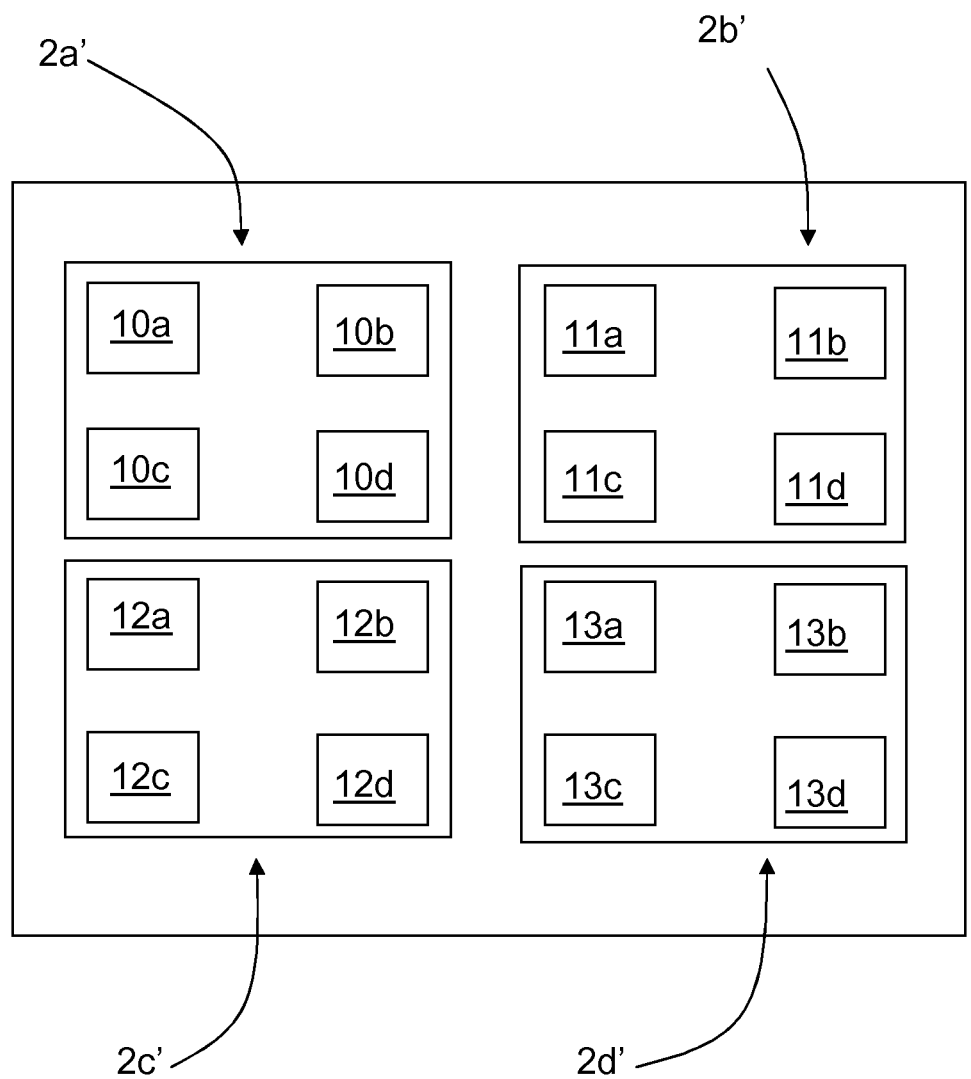
FIG. 9 schematically shows a front view of an alternative configuration of the antenna functions comprised in the antenna arrangement according to the present invention.

In FIG. 9 an alternative arrangement of the antenna functions 2a', 2b', 2c', 2d' is shown as an example, the antenna elements 10a, 10b, 10c, 10d; 11a, 11b, 11c, 11d; 12a, 12b, 12c, 12d; 13a, 13b, 13c, 13d in each antenna functions 2a', 2b', 2c', 2d' being arranged in two columns and two rows, where furthermore the antenna functions 2a', 2b', 2c', 2d' are arranged in two columns and two rows. The antenna functions 2a', 2b', 2c', 2d' are thus in this example positioned adjacent each other in both an azimuth plane and an elevation plane.

The phase shifters are generally constituted by signal altering means 4a, 4b, 4c, 4d arranged for altering the time characteristics and/or phase characteristics and/or frequency characteristics of a signal fed through the signal altering means.

The control information fed to the antenna functions 2a, 2b, 2c, 2d via the control connection 6 may be in any suitable form, for example as a description of time/phase/frequency gradient over the antenna. The control information may be in analogue or digital form, the important issue is that the control means 19a, 19b, 19c, 19d are arranged to interpret the received control information such that the signal altering means 4a, 4b, 4c, 4d may be suitably controlled.

The monitoring means 22a, 22b, 22c, 22d may retrieve the suitable data in many ways, for example by using a directional coupler positioned after the signal altering means 4a, 4b, 4c, 4d, by being fed data directly from the corresponding control means 19a, 19b, 19c, 19d or from the corresponding signal altering means 4a, 4b, 4c, 4d. The monitoring means 22a, 22b, 22c, 22d are equipped with means suitable for processing the retrieved data. The monitoring means 22a, 22b, 22c, 22d may be integrated with the signal altering means 4a, 4b, 4c, 4d, and the number of monitoring means 22a, 22b, 22c, 22d may vary in each antenna function, for example depending on the number of antenna elements in an antenna function.

In the examples, two monitoring units 9a, 9b have been disclosed. Of course, these can be combined to one monitoring unit, being arranged to trigger one or more alerts. There may be a scale of alerts depending on the seriousness of the possible malfunction.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description thereto are to be regarded as illustrative in nature, and not restrictive.

The invention claimed is:

1. An electrically steerable antenna arrangement comprising:
    at least a first antenna function;
    a second antenna function;
    a control unit configured tor feeding a signal comprising control information to the antenna functions via a control connection;
    a first monitoring unit connected to the control connection; and
    a second monitoring unit connected to the antenna functions,
    wherein:
        each antenna function comprises at least one antenna element, the antenna functions having at least one main radiation lobe that is electrically steerable;
        each antenna function comprises at least one signal altering means configured for altering at least one of time characteristics, phase characteristics, or frequency characteristics of a signal fed through the signal altering means;
        the signal altering means is configured to take settings determined based on at least the control information, such that an angular direction of said main radiation lobe in relation to an antenna reference plane is acquired, wherein the angular direction is determined by the settings of the signal altering means determined based on at least the control information;
        the first monitoring unit is configured to analyze the control information fed to the signal altering means and trigger a first alert via a first alert connection if there is a deviation which exceeds a first threshold;
        the antenna functions are configured to send signal information to the second monitoring unit regarding the resulting signal fed to said antenna elements; and
        the second monitoring unit is configured to analyze said signal information and to trigger a second alert via a second alert connection if there is a deviation which exceeds a second threshold.

2. An electrically steerable antenna arrangement according to claim 1, wherein the antenna functions are positioned adjacent each other in an azimuth plane and/or an elevation plane.

3. An electrically steerable antenna arrangement according to claim 2, wherein said main radiation lobe is steerable in said azimuth plane and/or in said elevation plane.

4. An electrically steerable antenna arrangement according to claim 1, wherein the control information fed to the antenna functions via the control connection comprises expected angular values.

5. An electrically steerable antenna arrangement according to claim 4, wherein each antenna function comprises at least one control unit configured for receiving the control information from the control connection and for controlling the signal altering means in dependence of the control information.

6. An electrically steerable antenna arrangement according to claim 1, wherein the first monitoring unit is configured for statistically analyzing the expected angular values fed via the control connection and for triggering the first alert when the number of expected angular values during a time period exceeds the first threshold.

7. An electrically steerable antenna arrangement according to claim 6, wherein the first monitoring unit is configured for performing said statistical analyzing by analyzing histogram data.

8. An electrically steerable antenna arrangement according to claim 1, wherein each antenna function comprises at least one monitoring means configured for determining how the phase of the resulting signal fed to said antenna elements changes during determined time interval.

9. An electrically steerable antenna arrangement according to claim 8, wherein said monitoring means are arranged for sending signal information to the second monitoring unit, the signal information comprising data regarding whether the phase change of the resulting signal fed to said antenna elements during the time interval falls below a third threshold.

10. An electrically steerable antenna arrangement according to claim 9, wherein the second monitoring unit is arranged for analyzing the signal information in the form of histogram data.

11. A method for controlling an electrically steerable antenna arrangement having at least a first antenna function and a second antenna function, the antenna functions having at least one main radiation lobe that is electrically steerable, the method comprising the steps:
    feeding a control signal to signal altering means used for altering time characteristics and/or phase characteristics and/or frequency characteristics of a signal fed through the signal altering means;
    the signal altering means taking settings determined based on at least the control signal, such that an angular direction of said main radiation lobe is acquired, wherein the angular direction is determined by the settings of the signal altering means determined based on at least the control signal;

monitoring the control signal;

monitoring the characteristics of the signal fed through the signal altering means; and analyzing the control signal fed to the signal altering means and triggering a first alert if there is a deviation which exceeds a first threshold, and analyzing the characteristics of the signal fed through the signal altering means and triggering a second alert if there is a deviation which exceeds a second threshold.

12. A method according to claim 11, wherein the control signal fed to the antenna functions comprises expected angular values.

13. A method according to claim 12, wherein the method comprises the steps of:

statistically analyzing the expected angular values fed to the signal altering means; and triggering the first alert when the number of expected angular values during a time period exceeds the first threshold.

14. A method according to claim 13, wherein the statistical analyzing is performed by analyzing histogram data.

15. A method according to claim 11, wherein the step of analyzing the characteristics of the signal fed through the signal altering means comprises determining how the phase of said signal actually changes during a determined time interval.

16. A method according to claim 11, wherein the step of analyzing the characteristics of the signal fed through the signal altering means comprises analyzing the signal information in the form of histogram data.

\* \* \* \* \*